US 6,556,383 B2

(12) United States Patent
Murphy et al.

(10) Patent No.: US 6,556,383 B2
(45) Date of Patent: Apr. 29, 2003

(54) DISC DRIVE ANTI-SHOCK SUSPENSION CUSHIONS

(75) Inventors: James Morgan Murphy, Boulder, CO (US); Joshua Charles Harrison, Stanford, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/441,761

(22) Filed: Nov. 17, 1999

(65) Prior Publication Data

US 2001/0030837 A1 Oct. 18, 2001

Related U.S. Application Data

(60) Provisional application No. 60/109,226, filed on Nov. 18, 1998.

(51) Int. Cl.[7] ............................................... G11B 21/22
(52) U.S. Cl. ................................................... 360/244.9
(58) Field of Search ........................... 360/244.2, 244.9, 360/245, 245.7, 244.7

(56) References Cited

U.S. PATENT DOCUMENTS

| 3,713,121 A | * | 1/1973 | Fasano et al. ............... 360/103 |
| 4,399,476 A | * | 8/1983 | King .......................... 360/104 |

FOREIGN PATENT DOCUMENTS

| EP | 0 617 411 A | | 9/1994 |
| JP | 1-248372 | * | 10/1989 |
| JP | 4-079085 | * | 3/1992 |
| JP | 6-259913 | * | 9/1994 |
| JP | 09 198628 | | 7/1997 |
| JP | 9-282823 | * | 10/1997 |
| JP | 11-213581 | * | 8/1999 |

OTHER PUBLICATIONS

English machine translation of JP 11–213581* (Aug. 1999) (4 pgs.).*

Primary Examiner—Brian E. Miller
(74) Attorney, Agent, or Firm—Merchant & Gould P.C.

(57) ABSTRACT

A suspension for connecting a slider to an actuator arm of a disc drive includes a cushion extending vertically from the suspension. The cushion limits vertical excursions and dampens motion of the suspension during a shock event to better maintain the slider in contact with a disc surface in the disc drive. The cushion can be formed as an external feature attached to the suspension, such as a foam or plastic cushion, or as an integral feature of the suspension. A disc drive assembly having a plurality of discs includes a first suspension and a first cushion extending vertically downward toward a second suspension. The second suspension may include a second cushion extending vertically upward toward the first suspension. The first cushion and one of the second suspension or the second cushion are spaced apart by a predetermined distance under normal operating conditions and engage one another to limit vertical excursions and dampen motion of the first and second suspensions when the disc drive undergoes a shock event.

17 Claims, 8 Drawing Sheets

U.S. PATENT DOCUMENTS

| | | | | |
|---|---|---|---|---|
| 4,760,478 | A | 7/1988 | Pal et al. | 360/104 |
| 4,777,550 | A | 10/1988 | Taguchi et al. | 360/97.02 |
| 4,812,935 | A | 3/1989 | Sleger | 360/106 |
| 4,819,094 | A | 4/1989 | Oberg | 360/104 |
| 4,843,503 | A | 6/1989 | Hazebrouck et al. | 360/106 |
| 4,905,111 | A | 2/1990 | Tuma et al. | 360/126 |
| 5,187,625 | A | 2/1993 | Blaeser et al. | 360/104 |
| 5,408,372 | A * | 4/1995 | Karam, II | 360/104 |
| 5,422,770 | A | 6/1995 | Alt | 360/105 |
| 5,623,758 | A * | 4/1997 | Brooks, Jr. et al. | 29/603.01 |
| 5,734,525 | A | 3/1998 | Girard | 360/104 |
| 5,793,569 | A | 8/1998 | Christianson et al. | 360/104 |
| 5,796,553 | A | 8/1998 | Tangren | 360/104 |
| 5,801,899 | A | 9/1998 | Genheimer | 360/97.01 |
| 5,805,381 | A | 9/1998 | Resh | 360/104 |
| 5,805,387 | A | 9/1998 | Koester | 360/106 |
| 5,831,793 | A | 11/1998 | Resh | 360/104 |
| 5,864,444 | A | 1/1999 | Baker et al. | 360/105 |
| 5,926,347 | A * | 7/1999 | Kouhei et al. | 360/254.3 |
| 5,936,799 | A | 8/1999 | Kuratomi | 360/97.03 |
| 5,936,804 | A * | 8/1999 | Riener et al. | 360/244.9 |
| 5,940,251 | A * | 8/1999 | Giere et al. | 360/104 |
| 5,949,617 | A | 9/1999 | Zhu | 360/104 |
| 5,959,806 | A * | 9/1999 | Leung | 360/104 |
| 6,055,134 | A * | 4/2000 | Boutaghou | 360/105 |
| 6,072,664 | A * | 6/2000 | Aoyagi et al. | 360/244.5 |
| 6,201,664 | B1 * | 3/2001 | Le et al. | 360/244.9 |
| 6,271,996 | B1 * | 8/2001 | Houk et al. | 360/244.9 |
| 6,351,350 | B1 * | 2/2002 | Symons et al. | 360/244.9 |

\* cited by examiner

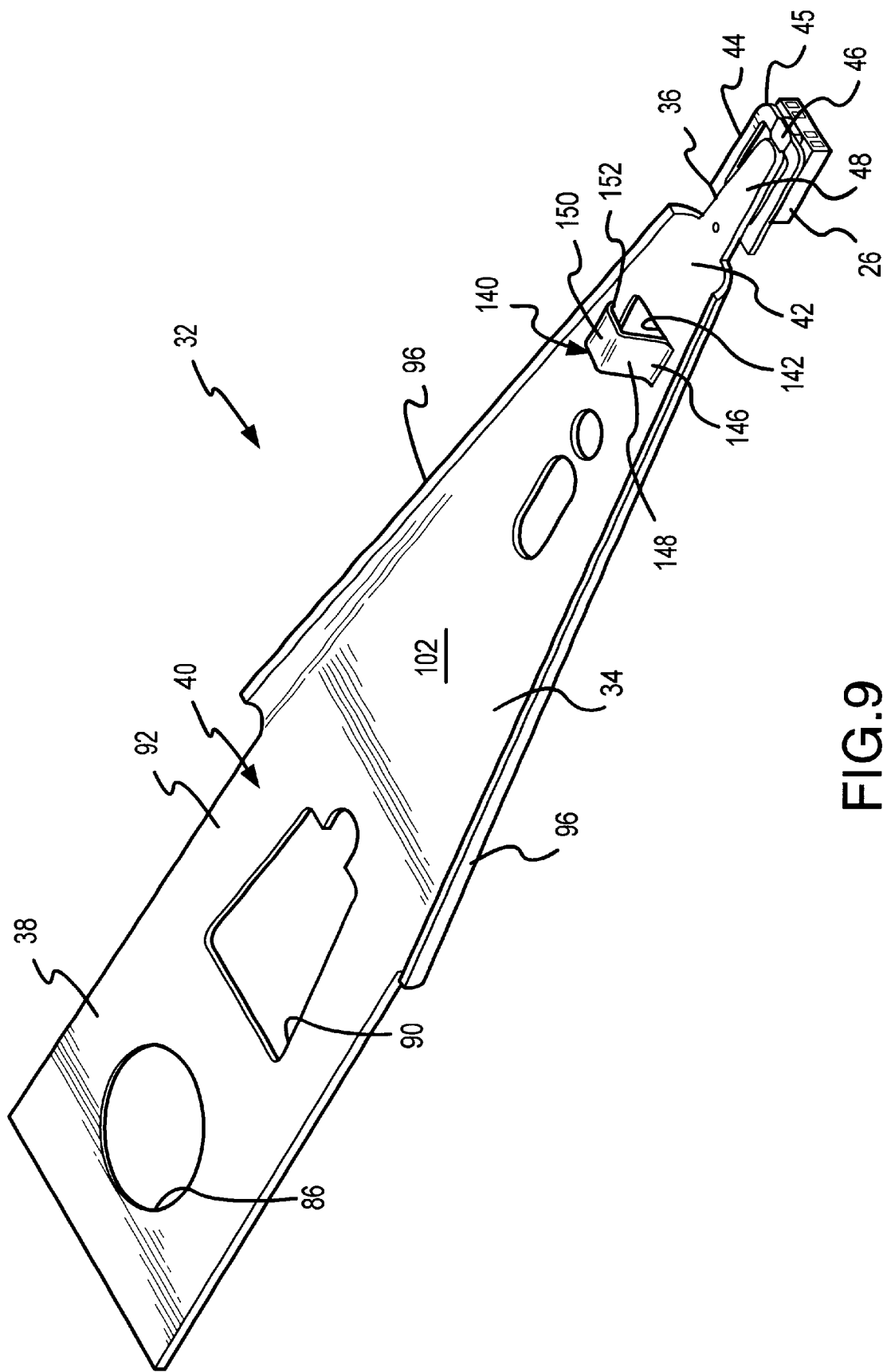

DISC DRIVE ANTI-SHOCK SUSPENSION CUSHIONS

RELATED APPLICATIONS

This application claims the benefit of U.S. Provisional Application No. 60/109,226, entitled ANTI-SHOCK SUSPENSION CUSHIONS, filed Nov. 18, 1998.

FIELD OF THE INVENTION

The present invention relates to disc drive storage devices. More particularly, the present invention relates to cushions placed on head suspensions of a disc drive to provide enhanced shock protection to the head by limiting vertical excursions and dampening motion of the suspension and the attached head.

BACKGROUND OF THE INVENTION

FIG. 1 illustrates a typical computer disc drive 20 that includes one or more discs 22 mounted on a hub 24 for rotation about a spindle axis 25 (FIG. 2). The discs 22 are typically coated with a magnetic medium for storage of digital information in a plurality of circular, concentric data tracks. A spindle motor rotates the hub 24 and the attached discs 22 about the axis 25 to allow a head or "slider" 26 carrying electromagnetic transducers to pass over each disc surface and read information from or write information to the data tracks.

The slider 26 is typically formed from a ceramic block having a specially etched air bearing surface that forms an air "bearing" as the disc rotates beneath the slider. The hydrodynamic lifting force provided by the air bearing surface causes the slider 26 to lift off and "fly" a very small distance above the surface of the disc 22 as the disc spins up to its operating speed. Although the fly height of the slider 26 is only a fraction of a micron, this thin film of air between the slider 26 and the disc 22 prevents damage to the fragile magnetic coating on the surface of the disc.

The slider 26 is preferably moved between data tracks across the surface of the disc 22 by an actuator mechanism 28 such as a rotary voice coil motor. The actuator 28 includes arms 30 (FIGS. 1 and 2) attached to each of the sliders 26 by flexible suspensions 32. Each suspension 32 essentially comprises a flat sheet metal spring that exerts a controlled preload force on the slider 26 in the vertical direction (i.e., against the surface of the disc 22 as shown in FIG. 2). The preload force supplied by the suspension 32 effectively counters the hydrodynamic force generated by the slider 26 and prevents the slider from flying too far off the surface of the disc 22. Although relatively flexible in the vertical direction, the suspension 32 is relatively stiff in the lateral direction in order to provide for precise lateral positioning of the slider 26 over the closely spaced data tracks.

The suspension 32 typically includes a relatively stiff load beam 34 (FIG. 3) and a relatively flexible gimbal 36 for attaching the slider 26. A first or proximal end 38 of the load beam 34 is attached to the arm 30 (FIG. 2) of the rotary actuator 28, and a relatively flexible region 40 (FIG. 3) of the load beam 34 adjacent the actuator arm 30 is typically bent downward toward the surface of the disc 22 to supply the aforementioned preload force. A second or distal end 42 of the load beam 34 opposite the actuator arm 30 is attached (such as by welding) to the more flexible gimbal 36 which, in turn, is fixed to the slider 26. An end of the gimbal 36 includes a cutout region defining two parallel flexure beams 44 and a cross member 45 defining an attachment pad 46. A tongue 48 of the load beam 34 typically protrudes within the cutout region of the gimbal 36 so that a dimple (not shown) on the bottom of the tongue 48 may contact a top surface of the slider 26 to transfer the preload force directly to the slider 26. The attachment pad 46 of the gimbal 36 is secured to the top surface of the slider, such as by an adhesive, so that the flexure beams 44 provide a resilient connection between the slider 26 and the relatively stiff load beam 34. The resilient connection provided by the gimbal 36 is important to allow the slider 26 to pitch and roll (i.e., "gimbal") while following the topography of the rotating disc 22. While FIG. 3 illustrates the load beam 34 and gimbal 36 as separate components, it is understood that these components may be formed from a single piece of metal forming an integrated suspension 32 (not shown).

Although the preload supplied by the bend region 40 of the load beam 34 is effectively countered by the hydrodynamic force generated by the slider 26 during rotation of the disc 22, that same preload force typically forces the slider 26 to rest on the surface of the disc 22 once the disc stops spinning and the hydrodynamic force dissipates (e.g., when the disc drive 20 is powered down). During these periods of inactivity, and particularly during assembly, shipping and handling of the disc drive 20 before the drive is assembled within a computer, the fragile magnetic coating on the surface of the disc 22 is susceptible to damage from accidental vertical displacement of the slider 26, such as by a shock event.

Vertical displacement of the slider 26 may occur when a disc drive 20 is subjected to a shock of sufficient magnitude to cause the actuator arm 30 and the attached suspension 32 to move away from the disc surface (either on the initial shock or on a rebound from the initial shock). Although the bend region 40 in the load beam 34 and the resilient nature of the gimbal 36 tend to hold the slider 26 against the disc surface even as the actuator arm 30 moves away from the disc 22, a sufficiently large shock (e.g., a shock 200 times the acceleration of gravity or 200 "Gs") will typically overcome the preload force and cause the slider 26 to be pulled off the disc surface. The return impact of the slider 26 against the disc surface can cause severe damage to the thin magnetic coating on the surface of the disc. If the shock event occurs during operation of the disc drive, the damage to the disc coating may create an unusable portion or sector of the disc and a potential loss of data stored on that portion of the disc. However, most large shock events typically occur during periods of inactivity, as described above, when the slider 26 is positioned along an inner radial portion or "landing region" of the disc 22 not used for data storage. Regardless of whether the impact occurs in the data region or the landing region of the disc 22, the impact typically generates debris particles that can migrate across the surface of the disc 22 and interfere with the air bearing surface of the slider 26, thereby causing damage to more vital regions of the disc 22 during disc operation and possibly leading to a disc "crash."

Previous efforts to minimize the above described "head slap" phenomenon have focused on either increasing the preload force applied by the bend region 40 or reducing the mass of the suspension 32 between the bend region 40 and the head or slider 26. Due to the resiliency of the bend region 40 of the load beam 34, it is primarily the mass of the end portion of the suspension 32 distal to the bend region 40 that determines the lifting force applied to the slider 26 during a shock event. That is, if the force tending to pull the head or slider 26 off the disc surface—as measured by the acceleration of the shock event (the number of Gs) multiplied by the combined mass of the slider 26 and the portion of the suspension 32 distal to the bend region 40—is greater than the preload force applied by the load beam 34, then the slider 26 will separate from the disc surface resulting in a "head slap" as described above. Therefore, a reduction in the mass of the suspension 32 distal to the bend region 40 leads to a reduction in the force applied to the slider 26 during a shock event and thus to improved shock performance for the disc drive 20.

However, reducing the mass of the suspension 32 typically leads to further problems and design compromises. For example, the typical method for reducing the mass of the suspension 32 entails shortening the portion of the suspension between the bend region 40 and the slider 26. However, shortening the suspension tends to increase the variation in the preload force applied by the suspension since the shorter suspension can not typically accommodate variations in the bend angle of the load beam 34 at the bend region 40. In other words, longer suspensions 32 provide lower variations in the preload force resulting from manufacturing tolerances in the bend region 40, while shorter suspensions trade enhanced shock performance for higher variations in the preload force due to these same manufacturing tolerances in the bend angle at the bend region 40. Due to the requirement for careful balancing of the preload force against the hydrodynamic force created by the slider 26, any significant variation of the preload force may cause damage to the fragile surface of the disc 22. Additionally, reducing the mass of the suspension 32 typically reduces the stiffness of the suspension and can adversely affect the tracking performance of the drive 20.

Furthermore, regardless of whether the preload force is increased or the mass of the suspension 32 is decreased, such a "solution" can lead to increased friction and wear problems at the head-disc interface.

It is with respect to these and other background considerations, limitations and problems that the present invention has evolved.

SUMMARY OF THE INVENTION

The present invention relates to a disc drive assembly having a suspension that includes a "cushion" to protect the slider attached to each suspension by limiting the vertical excursions of the slider and dampening any vibratory motion of the slider when the disc drive assembly undergoes a shock event.

In accordance with one embodiment of the present invention, a suspension is provided for connecting a slider to an actuator arm of a disc drive. The suspension maintains the slider substantially engaged with a disc surface and in one preferred embodiment includes a load beam with a gimbal at a distal end of the load beam. The gimbal is a flexible member that allows limited pitching and rolling motion of the slider while maintaining a stiff connection with the slider in the lateral direction. A "cushion" (i.e., a motion limiter and/or dampener) attached to the suspension extends vertically from the suspension. The cushion contacts another surface within the disc drive to limit vertical excursions and to dampen motion of the suspension during a shock event, thereby preventing head slap or at least reducing the severity of a resulting head slap. The cushion may comprise an external feature attached to the suspension, such as a foam or plastic cushion, or may comprise an integral feature of the suspension.

The present invention can also be implemented as a disc drive assembly having at least one disc mounted on a hub for rotation about a spindle axis and an actuator for moving an actuator arm above a surface of a disc. A suspension connects a slider to the actuator arm to maintain the slider substantially engaged with the disc surface. A cushion extends vertically away from the suspension. The cushion defines a contact surface spaced a predetermined distance from an engagement surface within the disc drive, and the contact surface contacts the engagement surface to limit vertical excursions and dampen motion of the suspension when the disc drive undergoes a shock event.

In one embodiment, the engagement surface comprises a contact surface of an adjacent cushion extending vertically from an adjacent suspension. In an alternative embodiment, the engagement surface comprises an adjacent suspension itself so that only a single cushion attached to one suspension separates two adjacent suspensions.

The present invention can further be implemented as a disc drive having a suspension maintaining a slider substantially engaged with a surface of a disc and means for limiting vertical excursions and for dampening motion of the suspension when the disc drive undergoes a shock event.

These and various other features as well as advantages which characterize the present invention will be apparent from a reading of the following detailed description and a review of the associated drawings.

BRIEF DESCRIPTION OF THE DRAWINGS

FIG. 8-1 is an enlarged, isometric view of an anti-shock cushion made from a plastic material with a hollow interior and an air port in accordance with an alternative preferred embodiment of the present invention.

FIG. 8-2 is an enlarged, isometric view of an anti-shock cushion made from a plastic material with four sides and a hollow interior in accordance with another alternative preferred embodiment of the present invention.

FIG. 9 is an enlarged, isometric view of a suspension/slider combination in accordance with an alternative preferred embodiment of the present invention where the anti-shock cushion is an integral feature of the suspension.

DETAILED DESCRIPTION OF THE PREFERRED EMBODIMENTS

Figure 1:
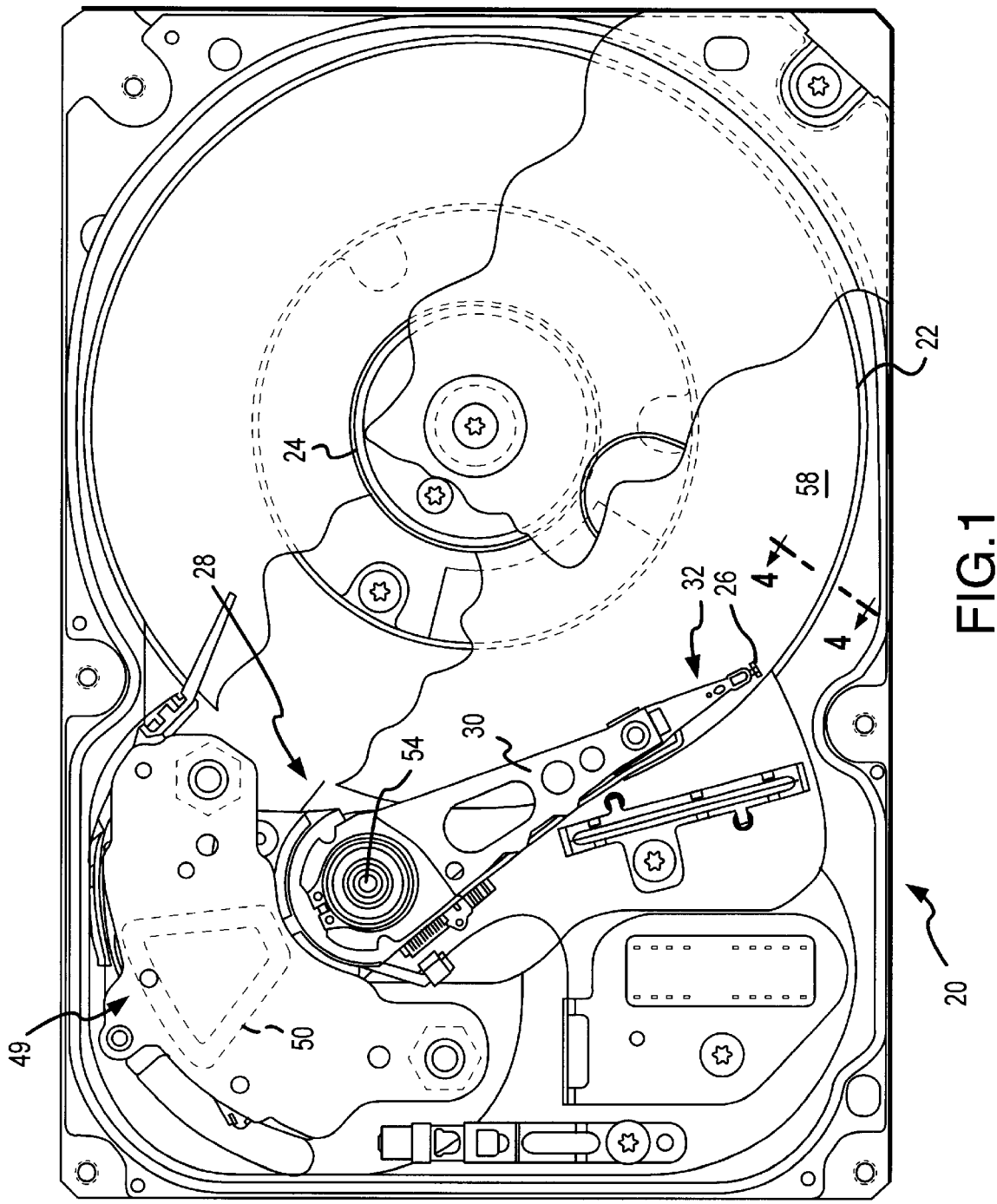
FIG. 1 is a top plan view of a disc drive in which the present invention is beneficially utilized.
Figure 2:
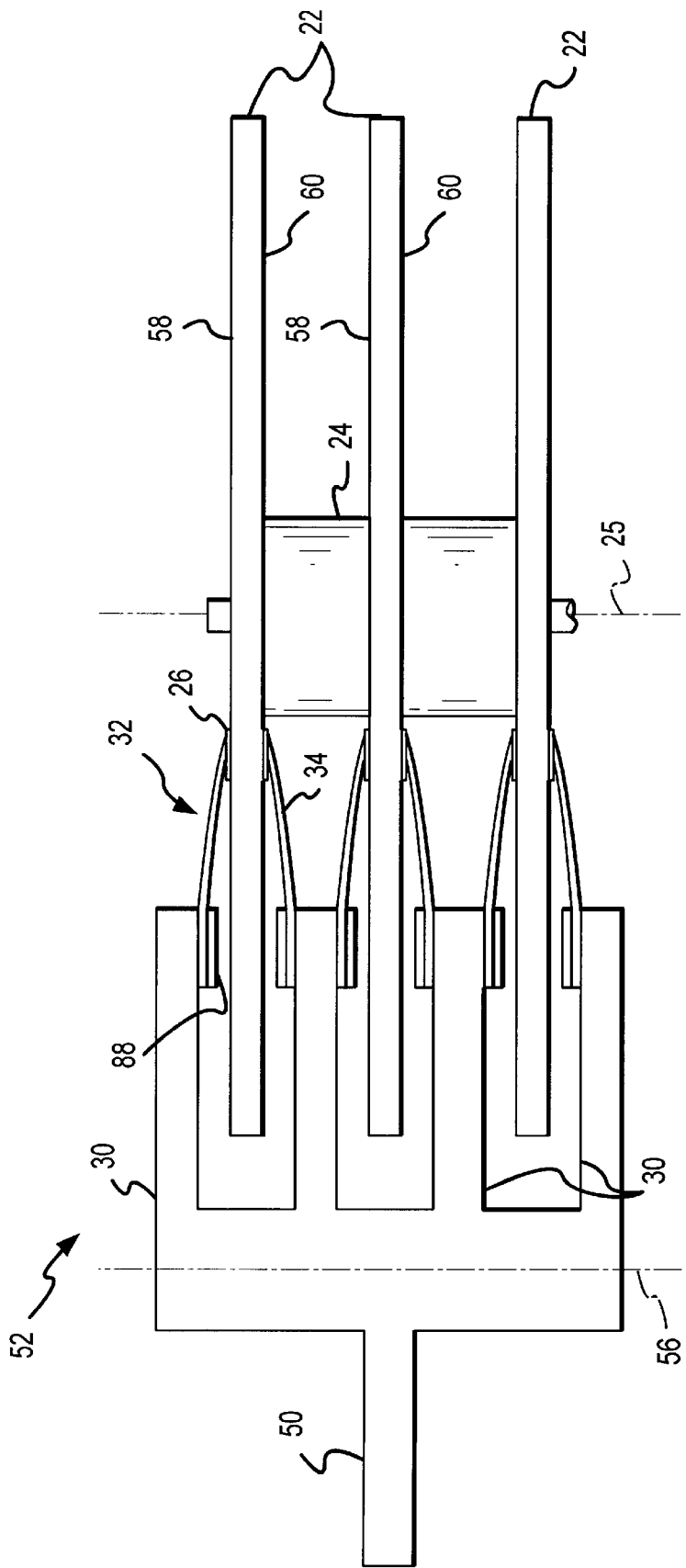
FIG. 2 is an elevated side view of three discs within the disc drive shown in FIG. 1, illustrating prior art suspensions connecting read/write heads or "sliders" to the arms of a rotary actuator.

The disc drive 20 illustrated in FIG. 1 includes a rotary actuator 28 for moving a head or "slider" 26 across the surface of a disc 22. The actuator 28 utilizes a voice coil motor 49 having a voice coil 50 that moves laterally within a magnetic field in response to electrical signals sent to the coil 50. The coil 50 is secured to one side of an E-block 52 (FIG. 2) for rotation about a pivot shaft 54 (FIG. 1) centered on a vertical axis 56, as best shown in FIG. 2. The opposite side of the E-block 52 includes a plurality of parallel, spaced-apart actuator arms 30 (FIG. 2). The top and bottom actuator arms 30 each attach a single suspension 32 for holding a slider 26 against the top and bottom surface (58 and 60) of their respective discs 22, while one or more intermediate actuator arms 30 attach two separate suspensions 32 to the bottom surface 60 of one disc 22 and the top surface 58 of another disc 22. Thus, movement of the voice coil 50 causes rotation of the E-block 52 about the axis 56 and movement of the sliders 26 over the surfaces 58 and 60 of the discs 22. Although several embodiments of the present invention are preferably described below with respect to the rotary voice coil motor 49, it is understood that the present invention may be used with any other type of actuator commonly utilized in disc drives, such as a linear actuator (not shown). Furthermore, while three discs 22 and six suspensions 32 are shown in FIG. 2, it is understood that the present invention may be beneficially used with any number of discs.

The load beam 34 comprises a metal sheet having a nominal thickness of approximately 2.0–2.5 thousandths of an inch ("mils"). The first or proximal end 38 of the load beam 34 includes a circular hole 86 for attaching the load beam 34 to the end of the actuator arm 30 of the E-block 52 (FIG. 2). A base plate 88 (FIG. 2) secures the load beam 34 to the actuator arm 30 to ensure that the relatively stiff load beam 34 moves together with the actuator 28. An opening 90 formed adjacent the proximal end 38 of the load beam 34 defines two relatively narrow spring elements 92 that may be bent downward to provide a predetermined preload force to the remainder of the load beam 34. The relatively flexible spring elements 92 and the opening 90 thus comprise the bend region 40 of the suspension 32, and the portion of the load beam 34 extending distally from the bend region 40 transfers the preload force to the slider 26.

The load beam 34 also includes vertical rails 96 extending distally from the bend region 40 along the side edges of the load beam 34 to enhance the stiffness of the load beam 34 in the vertical direction. The vertical stiffening rails 96 terminate at the tongue 48 at the distal end 42 of the load beam 34, and a dimple or etched post (not shown) is preferably fabricated on the underside of the tongue 48 for applying the preload force from the bend region 40 directly to the slider 26.

The gimbal 36 is formed from a relatively thin metal sheet having a nominal thickness of approximately 0.5 mils. The relatively thin flexure beams 44 thus allow the slider 26 to "gimbal" about the dimple (not shown) to follow the pitching and rolling motions of the disc 22 as described above. It will be understood by those skilled in the art that the suspension 32 may take a number of alternative forms, and that the load beam 34 and the gimbal 36 represent only one preferred embodiment of the suspension 32. For example, the suspension 32 may be formed as a single, integral body (not shown) rather than a combination of a separate load beam 34 and gimbal 36.

Figure 3:
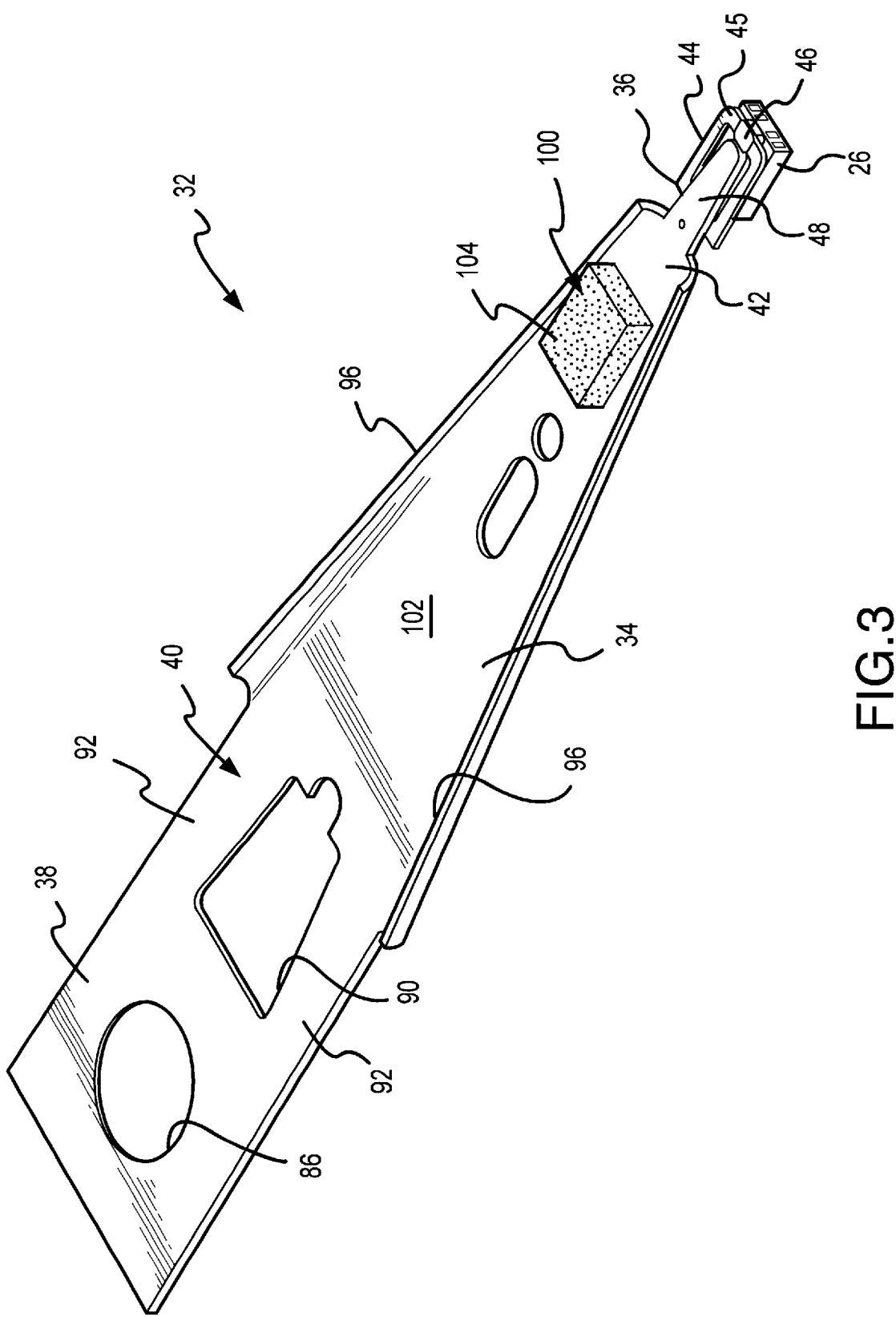
FIG. 3 is an enlarged, isometric view of a suspension/slider combination and an anti-shock cushion in accordance with a preferred embodiment of the present invention.

FIGS. 3–7 illustrate one preferred embodiment of an anti-shock cushion 100 of the present invention attached to the suspension 32. FIG. 3 illustrates that the cushion 100 is preferably attached to a top surface 102 of the load beam 34 between the opposing rails 96 and adjacent the distal end 42 of the load beam proximate to the gimbal 36 and the slider 26. Conventional means such as an adhesive material may be used to attach the cushion 100 to the top surface 102 of the load beam 34 so that a contact surface 104 of the cushion 100 extends a predetermined distance above the top surface 102 of the load beam 34. The precise shape and position of the cushion 100 on the load beam 34 may be chosen by one skilled in the art to optimize the cushioning properties described below. Additionally, the cushion 100 may be attached to the gimbal 36 or may be formed integrally with one part of the suspension 32, as described in greater detail below. Furthermore, the cushion 100 may be sized for use with a variety of different suspensions 32. Thus, it is understood that the invention is not limited to the particular cushion 100 and suspension 32 shown in FIG. 3.

Figure 4:
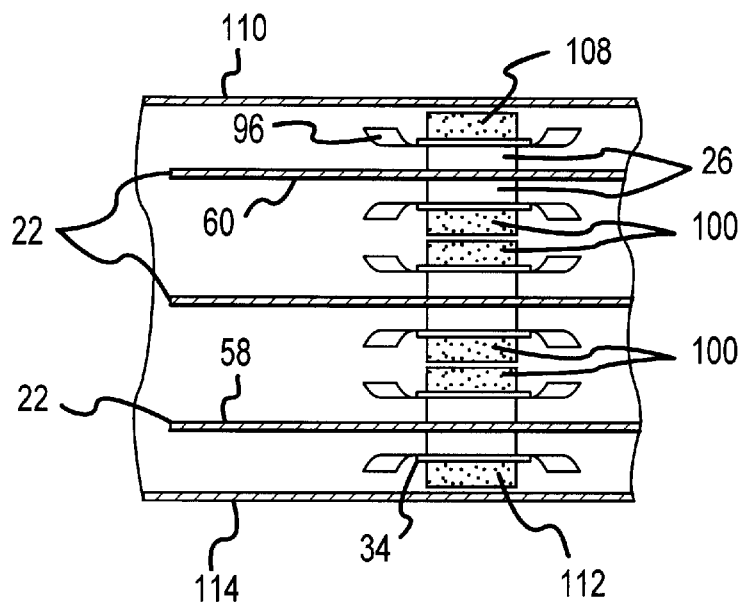
FIG. 4 is an enlarged section view taken substantially in the plane of line 4—4 of FIG. 1, illustrating an end view of the suspension/slider combination and the anti-shock cushions shown in FIG. 3.

A separate cushion 100 is preferably attached to each suspension 32 as shown in FIG. 4. The cushions 100 are preferably sized to leave a gap 106 between the contact surfaces 104 of adjacent cushions 100 so that the adjacent cushions do not contact each other under normal conditions (i.e., in the absence of a shock event). A similar gap 106 is preferably maintained between a top cushion 108 and a top cover 110 (FIG. 4) of the disc drive 20, as well as between a bottom cushion 112 and a base plate 114 of the disc drive. The gap 106 allows the cushions 100 and thus their corresponding sliders 26 to move a small vertical distance relative to the nominal horizontal plane of the disc surface 58 or 60. This freedom of movement allows adjacent sliders 26 to move independently as necessary to follow the contours and vertical undulations of their corresponding disc surface. However, the gap 106 is sufficiently small to substantially limit any vertical excursions of the suspensions 32 due to a shock event. Each gap 106 is approximately eleven (11) mils in the preferred embodiment shown in FIG. 4, although the gap 106 may be adjusted for optimal performance with suspensions 32 of different size or for different spacing between adjacent discs 22.

In essence, each disc 22 will typically vibrate or wobble as it spins during operation of the disc drive 20. It is therefore preferable for the sliders 26 to have a certain freedom of movement in the vertical direction to follow the contours and the motion of the disc surface. If the gap 106 between adjacent cushions 100 did not exist (i.e., if a single cushion was attached to both adjacent suspensions 32), the sliders 26 would be constrained from moving in the vertical direction and additional, variable forces would be applied to each of the sliders. Such additional forces may cause friction between (and thus damage to) the slider 26 and the surface of the disc 22. That is, without the air gap 106, the relatively stiff cushions 100 (which are necessary to limit and dampen relatively large non-operational shocks) would not be sufficiently compliant to allow unimpeded motion (i.e., the small, fast oscillations) of the slider 26 during operation of the disc drive 20.

Thus, the cushions 100 are preferably separated from one another, and from the top cover 110 and the base plate 114, so as to not interfere with the normal operation of the disc drive 20. It is only when the disc drive experiences a shock condition that the cushions 100 act to protect the fragile surfaces 58 and 60 of the discs 22. Such shock conditions can occur during operation of the disc drive 20 (such as when a user strikes a computer while the drive is operating), but more typically occur during manufacture, shipping or installation of the drive 20 within a computer. In either case, the cushions 100 function similarly to reduce or eliminate the "head slap" phenomenon and protect the disc surfaces from damaging impacts with the sliders 26.

Figure 5:
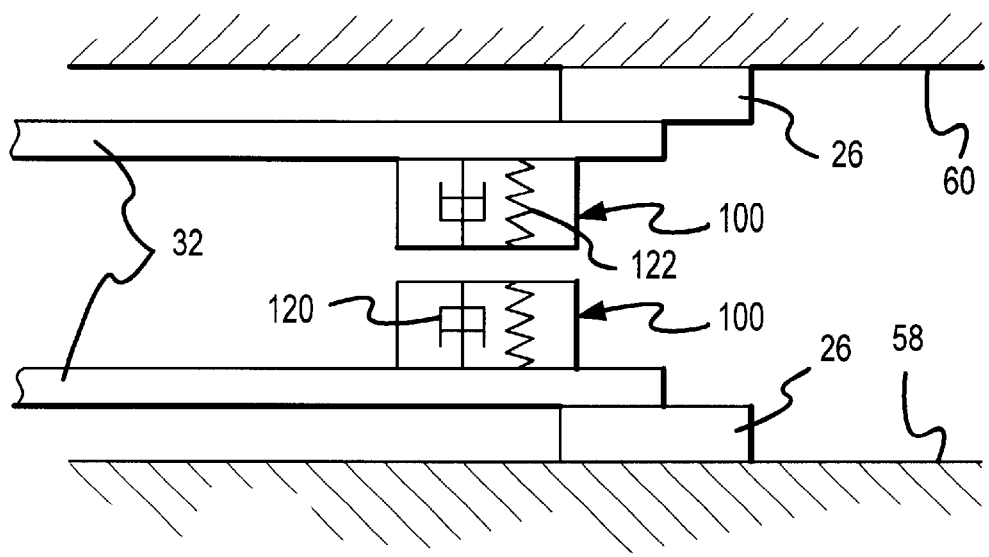
FIG. 5 is a schematic view of two opposing anti-shock cushions illustrating both the elastic and dampening properties of the cushions.

FIGS. 4 and 5 illustrate the preferred operation of the cushions 100. In these FIGS. 4 and 5 the discs 22 can be considered either to be at rest with the sliders 26 in contact with the disc surfaces 58 and 60 or, alternatively, the discs 22 can be considered to be spinning so that the sliders 26 are "flying" a very small distance off of the disc surface. In either case, the cushions 100 are positioned to contact an adjacent cushion 100 (or top cover 110 or base plate 114) in the event that the disc drive 20 experiences a shock that is sufficiently strong to cause an excursion of the load beam 34. In this manner, the cushions 100 act first to limit the motion of the load beam 34 in an effort to maintain the slider 26 in contact with the disc surface 58 or 60. That is, due to the flexible connection of the slider 26 to the load beam 34 via the gimbal 36, the slider 26 may remain in contact with the disc surface even though the load beam 34 is vertically displaced a small distance away from the disc surface. However, if the force of the shock is sufficiently strong to lift the slider 26 off the disc surface, the cushions 100 serve to limit the vertical displacement of the slider 26 and thereby reduce the force of the return impact between the slider 26 and the disc surface.

In addition to limiting the motion of the load beam 34, the cushions 100 also preferably serve to absorb the energy from the shock event to reduce vibrations between the slider 26 and the disc surface. Thus, the cushions 100 preferably exhibit dampening properties to prevent the load beam 34 from rattling between the disc surface and an adjacent cushion 100 (or top cover 110 or base plate 114) following a shock event. This dampening component of the cushions 100 is shown schematically by the dashpots 120 in FIG. 5.

In the preferred embodiment of the cushion 100 shown in FIGS. 3–7, this dampening characteristic is provided by forming the cushion 100 from a viscoelastic foam material. Such a viscoelastic foam cushion 100 would have a sufficient thickness, as described in greater detail below, to allow a slight compression of the cushion 100 in response to a shock event. For example, during a shock event where one cushion 100 impacts an adjacent cushion 100, both cushions may undergo a slight compression or deformation to absorb the energy of the shock (i.e., the shock energy is dissipated or converted into the work required to compress the foam cushions 100). A similar dampening effect occurs with a single cushion such as between the top cushion 108 and the top cover 110 or between the bottom cushion 112 and the base plate 114.

In addition to the dampening characteristics (or viscous portion) of the viscoelastic foam, it is also important that the cushion 100 exhibit an elastic quality as signified by the schematic springs 122 shown in FIG. 5. The elastic nature of the cushions 100 is necessary to ensure that cushions 100 retain their shape and functionality over the life of the disc drive 20. In essence, it is important that the cushions 100 "spring" back to their nominal shape (and maintain the preferred spacing within the gap 106) following a shock event so that they are prepared to cushion a subsequent shock event.

Figure 6:
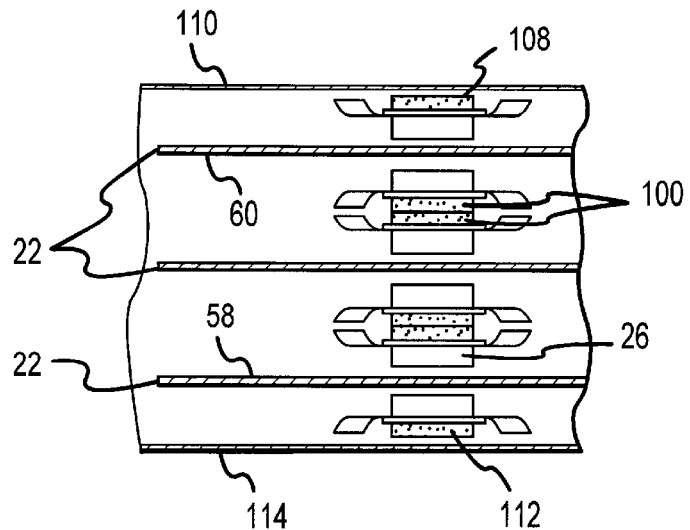
FIG. 6 is an enlarged section view similar to FIG. 4 illustrating the anti-shock cushions compressed such as for loading the suspension/slider combinations and the anti-shock cushions between the discs of the disc drive.

Secondly, the elastic nature of the viscoelastic cushions 100 allows the cushions 100 to be initially compressed for assembly between the discs 22 within the disc drive 20, as shown in FIG. 6. For example, the load beams 34 of a pair of adjacent suspensions 32 that must be inserted between two discs 22 can be pressed together so as to compress the cushions 100. The compressible or "viscous" nature of the cushions allows the cushions 100 to remain compressed while the opposing suspensions 32 and their attached sliders 26 are inserted between the discs 22 as shown in FIG. 6. Furthermore, the elastic nature of the cushions 100 allows the cushions 100 to return to their normal shape once the load arms 34 have been released and the preload force urges the sliders 26 to their normal position in contact with the disc surface.

The viscoelastic cushions 100 shown in FIGS. 3–7 are preferably formed from a microcellular foam material. The microcellular foam preferably exhibits the above-described properties and thus is relatively stiff against sudden compressions (on the order of a millisecond) in order to limit vertical excursions and dampen external shocks to the disc drive. However, the microcellular foam can be slowly compressed (on the order of a second) to allow for initial placement of the suspensions 32 and the attached cushions 100 between the discs 22 during manufacture of the drive 20, as described above.

Figure 7:
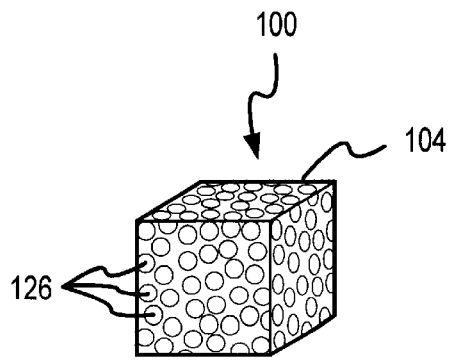
FIG. 7 is an enlarged, isometric view of the anti-shock cushion shown in FIG. 3 made from a foam material.

While one skilled in the art may utilize a variety of such microcellular foam materials, it is preferred to utilize a foam that exhibits relatively low levels of outgassing since outgassed compounds may accumulate on the disc surfaces and ultimately interfere with operation of the disc drive 20. Additionally, the dimensions of the block may differ from that shown in FIGS. 3 and 7, provided that there are a sufficient number of cells 126 along the vertical dimension of the block to provide for consistent dampening and elastic characteristics between different cushions 100. For example, the vertical dimension of the cushion 100 shown in FIG. 7 is approximately 20 mils (or about 0.5 millimeters). However, one skilled in the art may utilize different dimensions for the cushion 100 or may utilize a foam material having different sized cells. It is understood that the present invention is not limited by the preferred embodiment of the cushion 100 shown in FIGS. 3–7.

Figures 1, 2, 8:
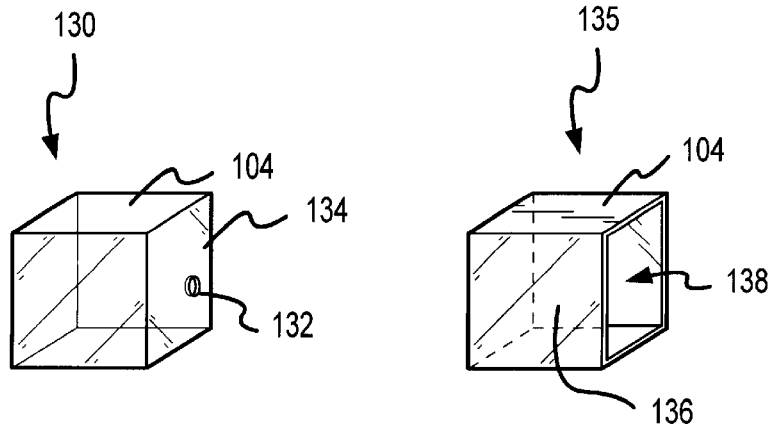

As an alternative to using a microcellular foam, FIGS. 8-1 and 8-2 illustrate two further preferred embodiments of the present invention utilizing alternative anti-shock cushions 130 and 135, respectively. The cushions 130 and 135 in FIGS. 8-1 and 8-2 are two examples of cushions that may be used in place of the cushion 100 shown in FIGS. 3–7 and are preferably formed from a thin walled plastic material (such as polyethylene). Of course, it is understood that one skilled in the art may conceive of alternative forms for the plastic cushions 130 and 135.

Specifically, the cushion 130 in FIG. 8-1 is either extruded or molded to form a sack or a "bubble" with a hollow interior. The plastic material that forms the cushion 130 thus provides the elastic or spring quality that ensures the cushion will undergo only elastic deformation as a result of a shock event. An air port 132 is preferably formed in at least one side 134 of the cushion 130 to allow air to fill the hollow interior of the cushion 130. The air port 132 also meters the outflow of air from the cushion 130 when the cushion is compressed. In this manner, the air port 132 and the hollow interior of the cushion 130 act like a conventional air shock absorber to dampen any impact experienced by the cushion 130.

The cushion 135 in FIG. 8-2 preferably takes the form of a frame having walls 136 on four sides and two open ends 138 leading to a hollow interior. The walls 136 have sufficient rigidity to withstand the types of non-operational shocks described above with minimal deflection. However, the open ends 138 allow the cushion 135 to be compressed in a conventional manner (i.e., with two pairs of adjacent walls 136 contacting one another) to enhance the assembly operation shown in FIG. 6.

The cushions 130 and 135 are preferably formed with dimensions similar to that of the microcellular foam cushion 100. One potential advantage of the plastic cushions 130 and 135 over the foam cushion 100 relates to outgassing and the fact that plastic materials such as polyethylene typically do not outgas compounds in the manner of foam materials.

A further advantage of both embodiments of the present invention shown in FIGS. 3–8 is that no change in the design of the suspension 32 or the slider 26 is required to achieve the shock absorbing benefits of the cushions 100, 130 or 135. However, additional work is required to first form and then attach the cushions 100, 130 or 135 to each suspension 32 of the disc drive. Thus, FIG. 9 illustrates a further embodiment of the present invention where an alternative cushion 140 is formed integrally with the load beam 34.

As shown in FIG. 9, the remainder of the suspension 32 and the slider 26 is substantially as shown in FIG. 3, and thus like portions have been identified with the same reference numbers. However, in place of the cushion 100 near the distal end 42 of the load beam 34, a three-sided opening 142 is preferably formed in the load beam 34 portion and a portion of the load beam is bent upward (such as through a stamping process) to form the cushion 140. Specifically, the cushion 140 includes a base segment 146 that remains attached to the load beam 34 along the closed end of the three-sided opening 142. A vertical segment 148 rises above the top surface 102 of the load beam to approximate the vertical dimension of the cushions 100 and 130 (e.g., approximately 20 mils). The vertical segment 148 terminates in a contact surface 150 having a tapered end 152 that is tapered downward toward the load beam 34. The contact surface 150 and tapered end 152 present a smooth surface for contacting an adjacent contact surface 150 of an adjacent cushion 140 (or a top cover 110 or a base plate 114 of the drive) without danger of the two cushions 140 becoming interlocked.

Of course, one skilled in the art could form the integral cushion 140 in many different ways. For example, the cushion 140 may be formed as part of the stiffening rails 96. Alternatively, the cushion 140 may be formed on the tongue 48 at the end of the load beam 34 or may be formed from the gimbal 36 to position the cushion 140 more closely to the slider 26. Furthermore, the suspension 32 may be formed as an integral body itself rather than from the combination of a separate load beam 34 and gimbal 36, as described above. In this case, the integral cushion 140 may be formed as one feature of the integral suspension 32.

As described above, the load beam 34 is preferably formed from a metal sheet having a nominal thickness of approximately 2.0–2.5 mils while the gimbal 36 typically has a thickness of less than one mil. Thus, regardless of whether the integral cushion 140 is formed from the load beam 34 or the gimbal 36, the cushion will have elastic properties similar to that of a metal spring in that the cushion 140 will return to its nominal position (and thus maintain the preferred gap 106) following a shock event. Furthermore, the cushion 140 can be compressed during manufacture of the drive (as described in FIG. 6) so long as the compression remains within the elastic range of the metal spring. While the integral cushion 140 will likely have a lower degree of dampening (i.e., a lower dampening constant) than the foam or plastic cushions 100, 130 or 135, it is understood that the choice of a particular cushion involves a number of trade-offs and it is desired to provide a disc drive designer with as many options as possible. Additionally, one skilled in the art may modify the integral cushion 140 by placing an additional dampening material atop the contact surface 150.

Figure 10:
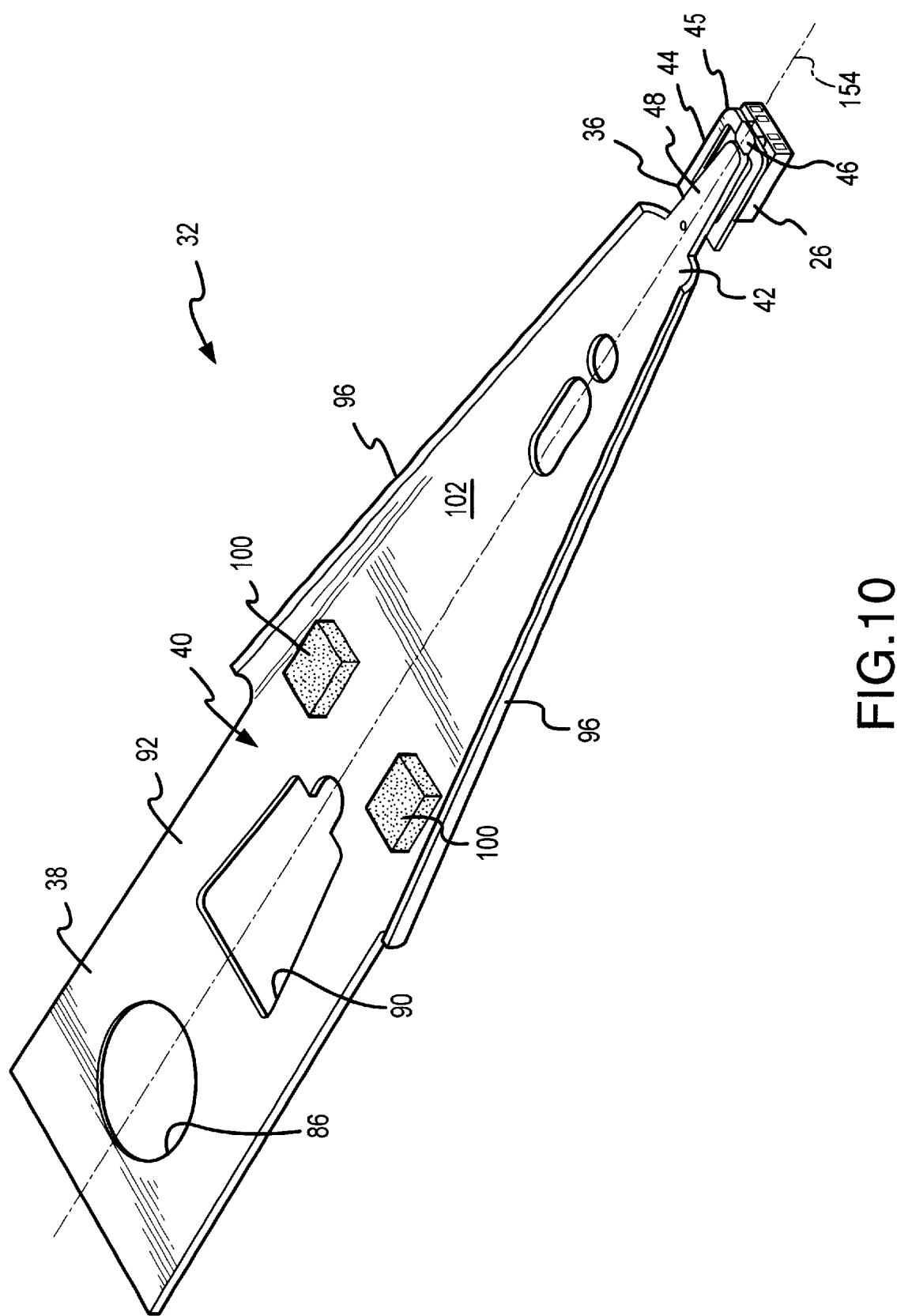
FIG. 10 is an enlarged, isometric view of a suspension/slider combination similar to FIG. 3 illustrating two anti-shock cushions offset from a centerline of the suspension in accordance with an alternative preferred embodiment of the present invention.

It should be further emphasized that the present invention is not limited to any particular location for the cushion or indeed to the use of a single cushion. As an alternative to the particular embodiment shown in FIG. 3, FIG. 10 illustrates that two or more cushions 100 may be positioned closer to the first end 38 of the load beam 34. The two cushions 100 are equally offset from a centerline axis 154 of the load beam 34. In this manner, the cushions 100 serve to dampen not only vertical vibrations of the load beam 34 but also torsional oscillations about the centerline 154. Such torsional oscillations can cause misalignment of the slider 26 with respect to the disc surface and can even cause damage to the disc surface when the slider impacts the surface of the disc 22 at an angle.

Figure 11:
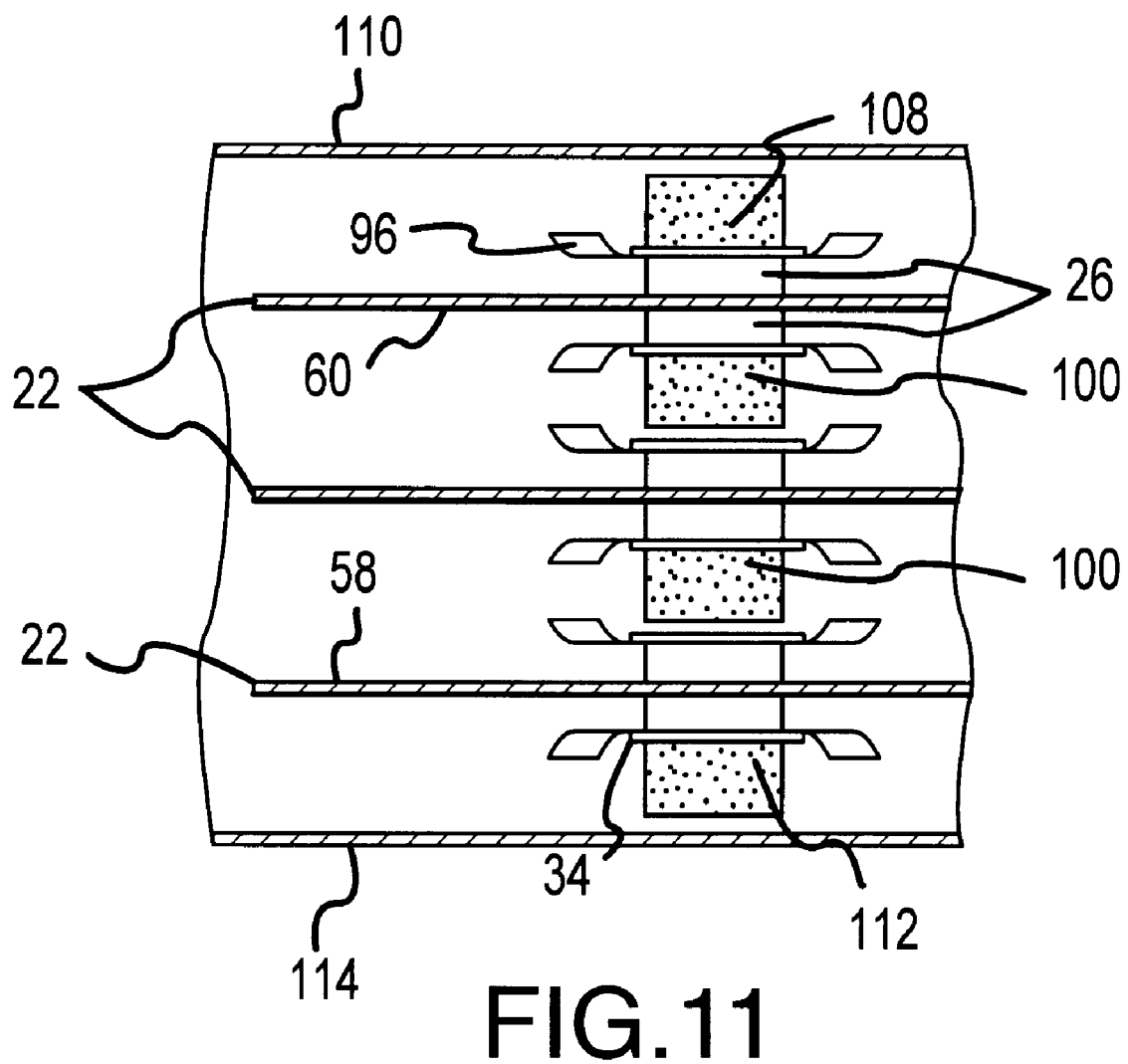
FIG. 11 is an enlarged section view similar to FIG. 4 illustrating a single, larger anti-shock cushion attached to the top and bottom suspensions and to one of two opposing suspensions in accordance with an alternative preferred embodiment of the present invention.

Furthermore, it is possible to use one relatively large cushion 100 rather than two smaller cushions 100 as shown in FIG. 11. That is, while it may be preferable to attach identically sized cushions 100 to each of the suspensions 32 to promote uniformity within the disc drive 20 as shown in FIG. 4, the present invention encompasses the use of a single cushion 100 attached to only one of the two opposing suspensions 32 positioned between two adjacent discs 22. Thus, in the embodiment shown in FIG. 11, a single cushion 100 is attached to only one of the suspensions 32 and extends toward the opposing suspension 32 while still leaving a gap between the cushion 100 and the opposing suspension 32.

It will also be evident to those skilled in the art that positioning the cushion 100 closer to the slider 26 will typically provide for smaller vertical excursions of the slider before the cushion contacts an opposing cushion or a portion of the case (such as the top cover 110 or base plate 114). However, the extra mass of the cushion 100 becomes a more significant design factor as the cushion approaches the slider 26 since the mass of the distal end of the load beam 34 (including the mass of the slider 26) determines the lifting force applied to the slider during a shock event. Thus, it is preferred to choose a relatively low-density material for the cushion 100 so that the mass of the cushion 100 will not overwhelm the mass of the suspension 32. For example, in the embodiment shown in FIG. 3, the mass of the microcellular foam cushion 100 is preferably approximately $\frac{1}{10}^{th}$ the mass of the slider 26.

Finally, it is to be understood that the present invention is not limited to any specific type of cushion. The choice of a particular type, size or position of a cushion will vary with the size and mass of the suspension/slider combination. While a number of exemplary cushions have been described in the above detailed description, the present invention encompasses alternative types of cushions as well as alternative materials for the cushions. For example, a rubber or other elastomeric material could be used in place of the specific foam and plastic materials described above. The only requirement is that the cushion act to both limit the movement of the suspension 32 and dampen any vibratory motion following a shock event.

In summary, the preferred embodiment exemplary of the invention and disclosed herein is directed to a suspension (such as 34) for connecting a slider (such as 26) to an actuator arm (such as 30) of a disc drive. The suspension (such as 34) includes a body having a proximal end (such as 38) for attaching the suspension to the actuator arm and a distal end (such as 42) for attaching the slider (such as 26). A cushion (such as 100, 130, 135 or 140) extends vertically from the suspension to contact a surface (such as 32, 104, 110, 114 or 150) within the disc drive (such as 20) to limit vertical excursions and dampen motion of the suspension (such as 32) during a shock event.

In another preferred embodiment of the present invention, the surface contacted by the cushion is part of an adjacent cushion (such as 100, 130, 135 or 140) extending vertically from an adjacent suspension (such as 32). The two adjacent cushions are spaced apart from one another by a predetermined distance in the absence of a shock event and, in one preferred embodiment, the predetermined distance is approximately 11 mils.

In another preferred embodiment of the present invention, the surface contacted by the cushion (such as 100, 130, 135 or 140) is either a top cover (such as 110) or a base plate (such as 114) of the disc drive (such as 20).

In another preferred embodiment of the present invention, the body of the suspension (such as 32) further includes a load beam (such as 34) and a gimbal (such as 36). The load beam (such as 34) includes a proximal end (such as 38) for attaching the load beam to the actuator arm (such as 30). The gimbal (such as 36) is attached to a distal end (such as 42) of the load beam (such as 34) for attachment to the slider (such as 26). The cushion (such as 100, 130, 135 or 140) extends vertically from either the load beam (such as 34) or the gimbal (such as 36).

In another preferred embodiment of the present invention, the cushion (such as 140) is formed integrally with the suspension (such as 32) as a vertical protrusion extending from one of the load beam (such as 34) and the gimbal (such as 36).

In another preferred embodiment of the present invention, the cushion (such as 100) is formed from a viscoelastic foam material.

In another preferred embodiment of the present invention, the cushion (such as 130 or 135) is formed from a plastic material.

In another preferred embodiment of the present invention, the cushion (such as 130) comprises a hollow body having an air port (such as 132) for expelling air during compression of the cushion.

In another preferred embodiment of the present invention, the cushion (such as 135) comprises a frame having a plurality of walls (such as 136) defining two open ends (such as 138) and an open interior.

In another preferred embodiment of the present invention, the cushion (such as 140) is formed integrally with the suspension (such as 32) as a vertical protrusion (such as 148 and 150) extending from the body.

In another preferred embodiment of the present invention, the suspension (such as 32) defines a longitudinal centerline (such as 154) and includes a second cushion (such as 100, 130, 135 or 140) extending vertically from the body. The two cushions are positioned symmetrically on opposite sides of the longitudinal centerline (such as 154) and equidistant from the distal end (such as 42) of the suspension. Each cushion (such as 100, 130, 135 or 140) is adapted to contact a surface (such as 32, 104, 110, 114 or 150) within the disc drive (such as 20) to limit vertical excursions and dampen torsional oscillations of the suspension (such as 32) during a shock event.

A further exemplary preferred embodiment of the present invention includes a disc drive assembly (such as 20) having at least one disc (such as 22) mounted on a hub (such as 24) for rotation about a spindle axis (such as 25), the disc (such as 22) having a surface (such as 58 or 60) for recording data, and the disc drive assembly (such as 20) further including an actuator (such as 28) for moving an actuator arm (such as 30) above the surface (such as 58 or 60) of the disc (such as 22). A suspension (such as 32) connects a slider (such as 26) to the actuator arm (such as 30) to maintain the slider (such as 26) substantially engaged with the disc surface (such as 58 or 60). The slider (such as 26) includes a transducer for reading and writing data to the disc surface (such as 58 or 60). The suspension (such as 32) includes a body having a proximal end (such as 38) attached to the actuator arm (such as 30) and a distal end (such as 42) attached to the slider (such as 26). A cushion (such as 100, 130, 135 or 140) extends vertically from the suspension and defines a contact surface (such as 104 or 150) spaced a predetermined distance from an engagement surface (such as 32, 104, 110, 114 or 150) within the disc drive (such as 20). The contact surface (such as 104 or 150) of the cushion (such as 100, 130, 135 or 140) contacting the engagement surface (such as 32, 104, 110, 114 or 150) to limit vertical excursions and dampen motion of the suspension (such as 32) when the disc drive (such as 20) undergoes a shock event.

In another preferred embodiment of the present invention, the engagement surface comprises a contact surface (such as 104 or 150) of an adjacent cushion (such as 100, 130, 135 or 140) extending vertically from an adjacent suspension (such as 32).

In another preferred embodiment of the present invention, the engagement surface comprises an adjacent suspension (such as 32).

In another preferred embodiment of the present invention, the engagement surface comprises either a top cover (such as 110) or a base plate (such as 114) of the disc drive (such as 20).

In another preferred embodiment of the present invention, the cushion (such as 100) is formed from a viscoelastic foam material.

In another preferred embodiment of the present invention, the cushion (such as 130 or 135) is formed from a plastic material.

In another preferred embodiment of the present invention, the cushion (such as 140) is formed integrally with the suspension (such as 32) as a vertical protrusion (such as 148 and 150) extending from the body.

A further exemplary preferred embodiment of the present invention includes a disc drive (such as 20) having a suspension (such as 32) maintaining a slider (such as 26) substantially engaged with a surface (such as 58 or 60) of a disc (such as 22) and means for limiting vertical excursions and for dampening motion of the suspension (such as 32) when the disc drive (such as 20) undergoes a shock event.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A suspension for connecting a slider to an actuator arm of a disc drive, the suspension adapted to maintain the slider substantially engaged with a surface of a disc, the suspension comprising:
   a body having a top surface facing away from the disc surface, a proximal end for attaching the suspension to the actuator arm and a distal end adapted for attachment to the slider; and
   a cushion attached to the top surface of the body and extending vertically away from the disc surface, the cushion adapted to contact a surface within the disc drive other than the disc surface to limit vertical excursions and dampen motion of the suspension during a shock event, wherein the cushion further comprises a hollow plastic body having an air port for expelling air during compression of the cushion.

2. A suspension for connecting a slider to an actuator arm of a disc drive, the suspension adapted to maintain the slider substantially engaged with a surface of a disc, the suspension comprising:
   a body having a top surface facing away from the disc surface, a proximal end for attaching the suspension to the actuator arm and a distal end adapted for attachment to the slider; and
   a cushion attached to the top surface of the body and extending vertically away from the disc surface, the cushion adapted to contact a surface within the disc drive other than the disc surface to limit vertical excursions and dampen motion of the suspension during a shock event, wherein the cushion further comprises a plastic frame having a plurality of walls defining two open ends and an open interior.

3. A disc drive assembly having at least one disc mounted on a hub for rotation about a spindle axis, the disc having a surface for recording data, the disc drive assembly further including an actuator for moving an actuator arm above the surface of the disc between an inner diameter and an outer diameter of the disc, and a suspension connecting a slider to the actuator arm to maintain the slider substantially engaged with the disc surface, the slider including a transducer for reading and writing data to the disc surface, and wherein the suspension comprises:
   a body having a top surface facing away from the disc surface, a proximal end attached to the actuator arm and a distal end attached to the slider;
   an elastically deformable cushion attached to the top surface of the body and defining a contact surface extending vertically away from the disc surface, the elastically deformable cushion compressed from a first operational size to a second compressed size during assembly of the suspension within the disc drive, wherein the elastically deformable cushion expands from the second compressed size to the first operational size following assembly of the suspension within the disc drive; and
   an engagement surface spaced a predetermined distance from the contact surface of the elastically deformable cushion as the actuator arm moves over the disc surface between the inner and outer diameters of the disc to engage the contact surface of the elastically deformable cushion and dampen vibratory motion of the suspension when the disc drive undergoes a shock event during operation of the disc drive, wherein the engagement surface comprises a surface within the disc drive other than the disc surface.

4. A disc drive assembly as defined in claim 3, wherein a plurality of discs are mounted on the hub and the engagement surface further comprises a contact surface of an adjacent elastically deformable cushion attached to the top surface of an adjacent suspension and extending vertically away from an adjacent disc surface.

5. A disc drive assembly as defined in claim 4, wherein adjacent elastically deformable cushions are compressed against each other during assembly of the suspension within the disc drive.

6. A disc drive assembly as defined in claim 4 wherein the adjacent elastically deformable cushions are each formed from a viscoelastic foam material.

7. A disc drive assembly as defined in claim 4 wherein the adjacent elastically deformable cushions are each formed from a plastic material.

8. A disc drive assembly as defined in claim 4 wherein the adjacent elastically deformable cushions are each formed integrally with the corresponding adjacent suspensions.

9. A disc drive assembly as defined in claim 3, wherein a plurality of discs are mounted on the hub and the engagement surface further comprises the top surface of an adjacent suspension.

10. A disc drive assembly as defined in claim 9, wherein the elastically deformable cushion is compressed against the top surface of the adjacent suspension during assembly of the suspension within the disc drive.

11. A disc drive assembly as defined in claim 3, wherein the engagement surface comprises one of a top cover and a base plate of the disc drive.

12. A disc drive assembly as defined in claim 3 wherein the elastically deformable cushion is formed from a viscoelastic foam material.

13. A disc drive assembly as defined in claim 3 wherein the elastically deformable cushion is formed from a plastic material.

14. A disc drive assembly as defined in claim 13 wherein the elastically deformable cushion further comprises a hollow body having an air port for expelling air during compression of the cushion.

15. A disc drive assembly as defined in claim 13 wherein the elastically deformable cushion further comprises a frame having a plurality of walls defining two open ends and an open interior.

16. A disc drive assembly as defined in claim 3 wherein the elastically deformable cushion is formed integrally with the suspension as a vertical protrusion extending from the top surface of the body.

17. A disc drive assembly as defined in claim 3 wherein the suspension defines a longitudinal centerline, the suspension further comprising:
   a second elastically deformable cushion attached to the top surface of the body and defining a contact surface extending vertically away from the disc surface, the two elastically deformable cushions positioned symmetrically on opposite sides of the longitudinal centerline and equidistant from the distal end of the body, each elastically deformable cushion contacting the engagement surface to limit vertical excursions and dampen torsional oscillations of the suspension during a shock event.

* * * * *